(12) United States Patent
Lee et al.

(10) Patent No.: US 9,460,848 B2
(45) Date of Patent: Oct. 4, 2016

(54) ANTENNA FOR INTER-CHIP WIRELESS POWER TRANSMISSION

(71) Applicant: SOONGSIL UNIVERSITY RESEARCH CONSORTIUM TECHNO-PARK, Seoul (KR)

(72) Inventors: Chang Hyun Lee, Seoul (KR); Chang Kun Park, Gyeonggi-do (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 303 days.

(21) Appl. No.: 14/468,330

(22) Filed: Aug. 26, 2014

(65) Prior Publication Data

US 2015/0054710 A1    Feb. 26, 2015

(30) Foreign Application Priority Data

Aug. 26, 2013 (KR) ........................ 10-2013-0101079

(51) Int. Cl.
*H01F 27/42*    (2006.01)
*H01F 38/14*    (2006.01)
*H02J 5/00*     (2016.01)
*H01Q 21/28*    (2006.01)
*H01Q 1/22*     (2006.01)

(52) U.S. Cl.
CPC ............ *H01F 38/14* (2013.01); *H01Q 1/2283* (2013.01); *H01Q 21/28* (2013.01); *H02J 5/005* (2013.01); *H02J 50/40* (2016.02)

(58) Field of Classification Search
CPC ......... H01F 38/14; H02J 50/40; H02J 5/005; H01Q 1/2283; H01Q 21/28
See application file for complete search history.

(56) References Cited

U.S. PATENT DOCUMENTS

| 8,400,248 | B2 | 3/2013 | Kim et al. |
| 8,991,717 | B2 * | 3/2015 | Murayama ........... H01Q 1/2283 235/492 |
| 9,086,452 | B2 * | 7/2015 | Wang ................. G01R 31/2889 |
| 2011/0156488 | A1 * | 6/2011 | Kuroda .................. H01L 23/48 307/104 |

FOREIGN PATENT DOCUMENTS

KR    10-2012-0040779 A    4/2012

* cited by examiner

*Primary Examiner* — Daniel Cavallari
(74) *Attorney, Agent, or Firm* — Revolution IP, PLLC

(57) ABSTRACT

Disclosed is an antenna for inter-chip wireless power transmission in a 3D-wireless chip package, wherein the 3D-wireless chip package includes: a first chip transmitting AC power through a transmitting antenna; and a plurality of second chips sequentially stacked on or under the first chip and receiving the AC power from the first chip through receiving antennas, respectively, and the receiving antennas are individually formed on the second chips, respectively, and positioned without vertically overlapping each other over or under the transmitting antenna.

5 Claims, 4 Drawing Sheets

ANTENNA FOR INTER-CHIP WIRELESS POWER TRANSMISSION

CROSS-REFERENCE TO RELATED APPLICATIONS

This application claims the priority of Korean Patent Application No. 10-2013-0101079 filed on Aug. 26, 2013, in the Korean Intellectual Property Office, the disclosure of which is incorporated herein by reference.

BACKGROUND OF THE INVENTION

1. Field of the Invention

The present invention relates to an antenna for inter-chip wireless power transmission, and more particularly, to an antenna for inter-chip wireless power transmission in a 3D-wireless chip package.

2. Description of the Related Art

Recently, technologies of stacking a plurality of chips to reduce the design areas of integrated circuits have been studied. A TSV (Through Silicon Via) technology generally used in recent years in the technologies provides a signal path between stacked chips by forming a vertical electrode through silicon that is a material of semiconductor substrates.

According to the TSV technology, pads for electric connection of stacked chips are not exposed to the outside and the pads are connected to each other between the chips through a via and a bump, so bonding wires can be removed and metal wires patterned on a PCB (Printed Circuit Board) can be removed. Therefore, the TSV technology has the advantage that it is possible to remove parasitic components due to the bonding wires and the PCB metal wires and to achieve inter-chip high-speed communication.

However, since the via is formed by forming a physical hole in a chip and filing the hole with a metallic material, there is a problem in that the development and commercialization costs increase due to the additional semiconductor process. Further, it takes much effort to increase the yield ratio of the via due to a problem like cracks. As a result, the TSV technology increases the manufacturing cost.

In order to solve those problems, recently, an inter-chip wireless communication technology has been studied. Since the inter-chip wireless communication technology performs communication between chips by wireless, it has the advantage that there is no need for making a via through a chip, as in the TSV technology.

FIG. 1 is a view illustrating the concept of an inter-chip wireless communication technology according to the related art. Referring to FIG. 1, the stacked chips each have an antenna for wireless power transmission between them. FIG. 1 is an example in which the antennas of the chips are inductors that induce inductive coupling.

The antenna of the uppermost chip or the lowermost chip can transmit power to the antennas of the other chips by wireless. According to the vertical stacking structure of chips, the distances from transmitting antennas to the receiving antennas are different. Accordingly, there is a problem in that the transmission efficiency is different in accordance with the distance from the transmitting antenna on each layer.

The background of the present invention has been disclosed in Korean Patent Application Publication No. 2012-0040779 (2012.04.30)

SUMMARY OF THE INVENTION

An aspect of the present invention provides an antenna for inter-chip wireless power transmission which can increase efficiency of inter-chip wireless power transmission by improving the structure of an antenna in a 3D-wireless chip package.

According to an aspect of the present invention, there is provided an antenna for inter-chip wireless power transmission in a 3D-wireless chip package, in which the 3D-wireless chip package includes: a first chip transmitting AC power through a transmitting antenna; and a plurality of second chips sequentially stacked on or under the first chip and receiving the AC power from the first chip through receiving antennas, respectively, and the receiving antennas are individually formed on the plurality of second chips, respectively, and positioned without vertically overlapping each other over or under the transmitting antenna.

Here, the receiving antennas may have different sizes in accordance with the distances from the transmitting antenna.

Further, the larger the distances from the transmitting antenna, the larger the sizes of the receiving antennas may be.

Here, the sizes of the receiving antennas may be proportioned to the squares of the distances from the transmitting antenna.

Further, the sum of the sizes of the receiving antennas may be the same as the size of the transmitting antenna.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, embodiment of the present invention will be described in detail with reference to the accompanying drawings for those skilled in the art to be able to easily accomplish the present invention.

The present invention relates to an antenna for inter-chip wireless power transmission in a 3D-wireless chip package. The 3D-wireless chip package includes a first chip transmitting AC power through a transmitting antenna and a plurality of second chips sequentially stacked on or under the first chip and receiving AC power from the first chip through their receiving antennas.

According to an embodiment of the present invention, efficiency of wireless power transmission is increased by improving the structures of the antennas of the second chips which receive power in wireless from the antenna of the first chip.

A 3D-wireless chip package including a plurality of second chips stacked under a first chip is exemplified hereafter for the convenience of description. Further, an embodiment of the present invention is described with the shapes of a transmitting antenna and receiving antennas of the chips. Obviously, the embodiment of the present invention may be applied to a structure in which a plurality of second chips is stacked on a first chip.

Figure 1:
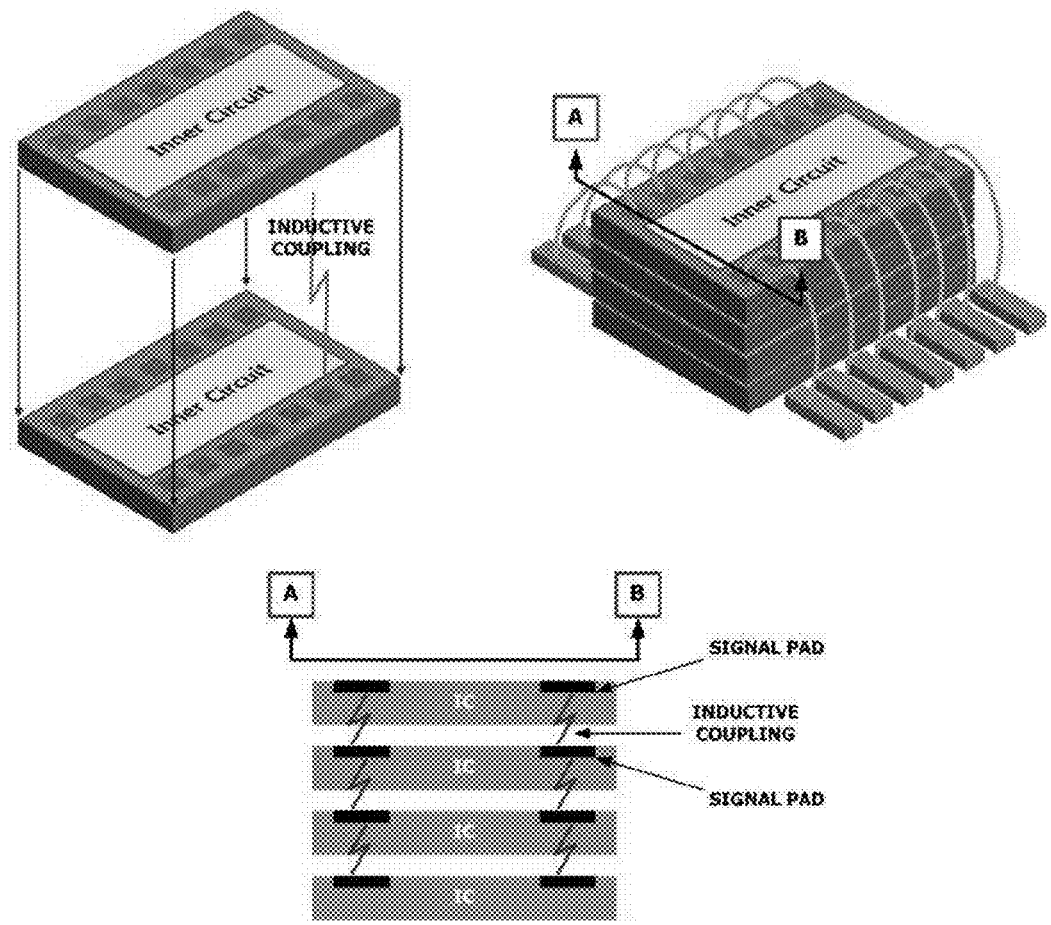
FIG. 1 is a view illustrating the concept of an inter-chip wireless communication technology according to the related art.
Figure 2:
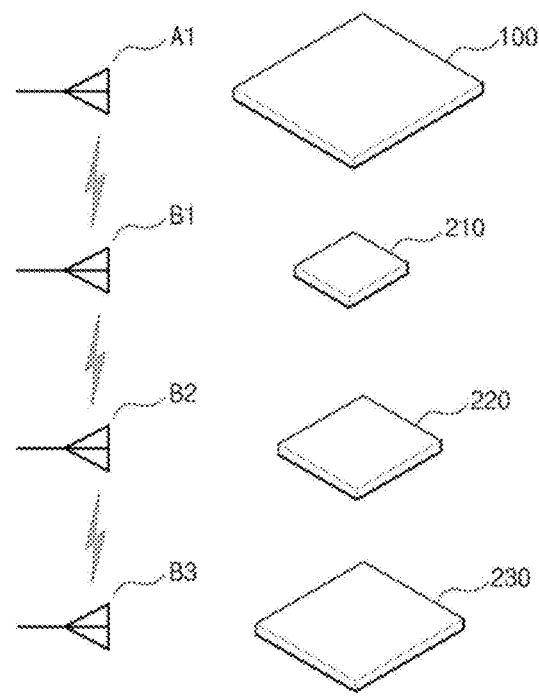
FIG. 2 is a view illustrating the configuration of an antenna for inter-chip wireless power transmission according to a first embodiment of the present invention.

FIG. 2 is a view illustrating the configuration of an antenna for inter-chip wireless power transmission according to a first embodiment of the present invention. FIG. 2 illustrates a transmitting antenna 100 that is an antenna A1 on a first chip and receiving antennas 210, 220, and 230 that are antennas B1 to B3 on three second chips under the first chip. The gaps between the antennas correspond to the gaps between the chips.

FIG. 2 illustrates an example in which the transmitting antenna 100 and the receiving antennas 210, 220, and 230 transmit/receive power in wireless by electric coupling to each other, and the antennas are made in capacity types. In this configuration, the antennas spaced from each other are made of metal plates.

The second chips receiving power in wireless have relatively different electric coupling forces in accordance with the distances from the first chip. The sizes of the receiving antennas 210, 220, and 230 are made different in accordance with the distances from the transmitting antenna 100 in FIG. 2 in order to make up for this problem. That is, the farther the receiving antennas from the transmitting antenna 100, the larger the size. The principle is described in detail hereafter.

First, the transmitting antenna 100 and the first receiving antenna 210 are metal plates facing each other in parallel and a capacitance component exists between the metal plate of the transmitting antenna 100 and the metal plate of the first receiving antenna 210.

Further, a parasitic capacitance component exists between the metal plate of the transmitting antenna 100 and the metal plate of the second receiving antenna 220 too. However, since the second receiving antenna 220 is relatively farther from the transmitting antenna 100 than the first receiving antenna 210, the electric coupling may weaken. To make up for this problem, the metal plate of the second receiving antenna 220 is formed larger than the metal plate of the first receiving antenna 210. In the same way, the metal plate of the third receiving antenna 230 farthest from the transmitting antenna 100 is formed larger than the metal plate of the second receiving antenna 220. According to this configuration, the power reception rates of the receiving chips according to the distances from the transmitting antenna can be adjusted to be relatively uniform.

The configuration of changing the sizes of receiving antennas in accordance with the distances from a transmitting antenna, as described above, can be applied in the same way to antennas based on inductive coupling, other than the antennas based on electric coupling, as in the first embodiment.

Figure 3:
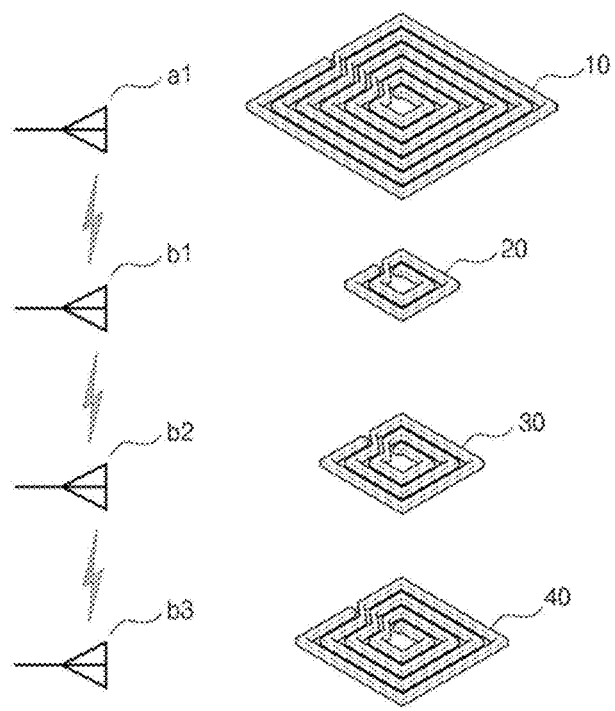
FIG. 3 is an embodiment when the antenna based on electric coupling in FIG. 2 is replaced by an antenna based on inductive coupling.

FIG. 3 is an embodiment when the antenna based on electric coupling in FIG. 2 is replaced by an antenna based on inductive coupling. When the inductive coupling is used, all of the transmitting and receiving antennas illustrated in FIG. 2 are formed in spiral inductor types.

FIG. 3 illustrates a transmitting antenna 10 that is an antenna a1 on a first chip and receiving antennas 20, 30, and 40 that are antennas b1 to b3 on three second chips under the first chip. The farther the receiving antennas from the transmitting antenna, the larger the sizes of the inductors. The sizes of the inductors can be determined by adjusting the winding number of the inductors, the thickness of a metal wire, and the inter-line gap.

Figure 4:
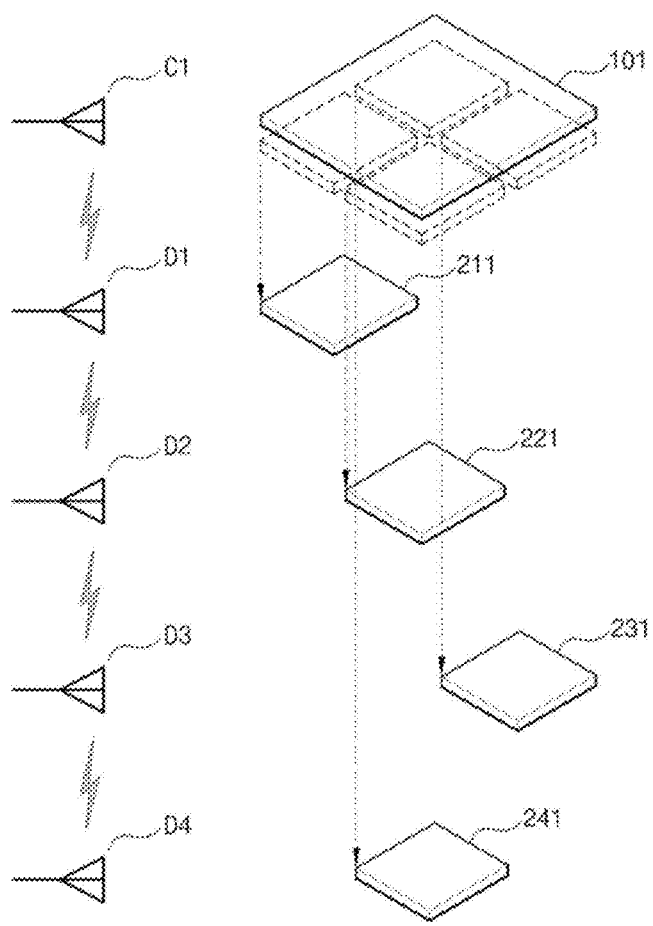
FIG. 4 is a view illustrating the configuration of an antenna for inter-chip wireless power transmission according to a second embodiment of the present invention.

FIG. 4 is a view illustrating the configuration of an antenna for inter-chip wireless power transmission according to a second embodiment of the present invention. FIG. 4 illustrates a transmitting antenna 101 that is an antenna C1 on a first chip and receiving antennas 211, 221, 231, and 241 that are antennas D1 to D4 on four second chips under the first chip. The antennas illustrated in FIG. 4 are also formed in capacitor types and transmit/receive power in wireless by electric coupling to each other.

Here, the receiving antennas 211, 221, 231, and 241 are disposed on four second chips, respectively, without vertically overlapping each other under the transmitting antenna 101. Accordingly, the transmitting antenna is not blocked by the receiving antennas, such that all the receiving antennas 211, 221, 231, and 241 can be disposed to directly face the transmitting antenna 101, and thus the wireless power transmission efficiency can be increased.

Here, the second chips receiving power in wireless have relatively different electric coupling in accordance with the distances from the first chip. To make up for this problem, the sizes of the receiving antennas are made different in accordance with the distances from the transmitting antenna in this embodiment.

Figure 5:
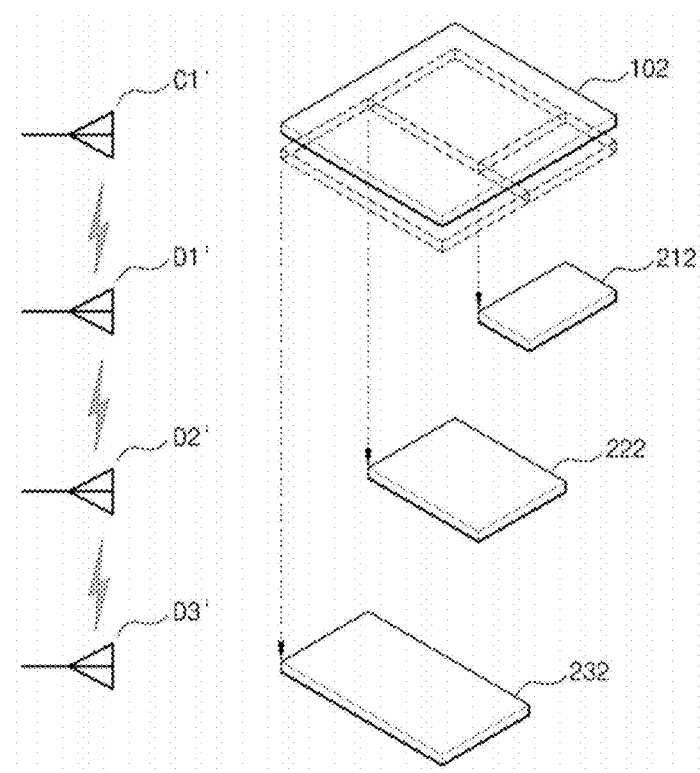
FIG. 5 is a view illustrating another example of an antenna for inter-chip wireless power transmission according to the second embodiment of the present invention.

FIG. 5 is a view illustrating another example of an antenna for inter-chip wireless power transmission according to the second embodiment of the present invention. FIG. 5 illustrates a transmitting antenna 102 that is an antenna C1' on a first chip and receiving antennas 212, 222, and 232 that are antennas D1' to D3' on three second chips under the first chip.

In FIG. 5, the receiving antennas 212, 222, and 232 are positioned without overlapping each other under the transmitting antenna 102, in the same was as in FIG. 4, and the sizes of the receiving antennas 212, 222, and 232 were made different in accordance with the distance from the transmitting antenna 102.

That is, the farther the receiving antennas 212, 222, and 232 from the transmitting antenna 102, the larger the sizes. The sizes of the receiving antennas 212, 222, and 232 may be proportioned to the squares of the distances from the transmitting antenna 102. This is based on that the magnitude of a wireless signal is in inverse proportion to the square of the distance.

According to this configuration, as in the first embodiment, it is possible to solve the problem that the electric coupling forces between a transmitting antenna and receiving antennas of chips are different in accordance with the distances from the transmitting antenna and it is also possible to adjust the power reception efficiency of the chips to be uniform.

Further, it can be seen that the sum of the sizes of the receiving antennas is the same as the size of the transmitting antenna in both of the embodiments illustrated in FIGS. 4 and 5. Accordingly, all the receiving antennas can face the transmitting antenna without interference with each other. Further, it is possible to adjust the sizes of the receiving antennas according to the distances from the transmitting antenna, within the range of the size of the transmitting antenna, such that it is possible to increase the wireless power transmission/reception efficiency.

According to the antenna for inter-chip wireless power transmission of the present invention, since antennas on chips receiving power in wireless are positioned without vertically overlapping each other, it is possible to increase inter-chip wireless power transmission efficiency. Further, it is possible to solve the problem of unbalanced power reception due to different distances between chips by making the sizes of antennas on receiving chips different in accordance with the distance from an antenna on a transmitting chip.

Although the present invention has been described with reference to the embodiments illustrated in the drawings, those are only examples and may be changed and modified into other equivalent embodiments from the present invention by those skilled in the art. Therefore, the technical protective region of the present invention should be determined by the scope described in claims.

As set forth above, according to exemplary embodiments of the invention, since antennas on chips receiving power in wireless are positioned without vertically overlapping each other, it is possible to increase inter-chip wireless power transmission efficiency. Further, since the antennas on the receiving chips have different sizes in accordance with the distances from the antenna on the transmitting chip, it is possible to solve the problem of unbalanced power reception due to different distances between chips.

While the present invention has been illustrated and described in connection with the exemplary embodiments, it will be apparent to those skilled in the art that modifications and variations can be made without departing from the spirit and scope of the invention as defined by the appended claims.

What is claimed is:

1. An antenna for inter-chip wireless power transmission in a 3D-wireless chip package, wherein the 3D-wireless chip package includes:
   a first chip transmitting AC power through a transmitting antenna; and
   a plurality of second chips sequentially stacked on or under the first chip and receiving the AC power from the first chip through receiving antennas, respectively, and
   the receiving antennas are individually formed on the second chips, respectively, and positioned without vertically overlapping each other over or under the transmitting antenna.

2. The antenna of claim 1, wherein the receiving antennas have different sizes in accordance with the distances from the transmitting antenna.

3. The antenna of claim 2, wherein the larger the distances from the transmitting antenna, the larger the sizes of the receiving antennas.

4. The antenna of claim 3, wherein the sizes of the receiving antennas are proportioned to the squares of the distances from the transmitting antenna.

5. The antenna of claim 3, wherein the sum of the sizes of the receiving antennas is the same as the size of the transmitting antenna.

* * * * *